N. A. Rhoads,
Wringer
No. 1360. Reissued Dec. 9, 1862.
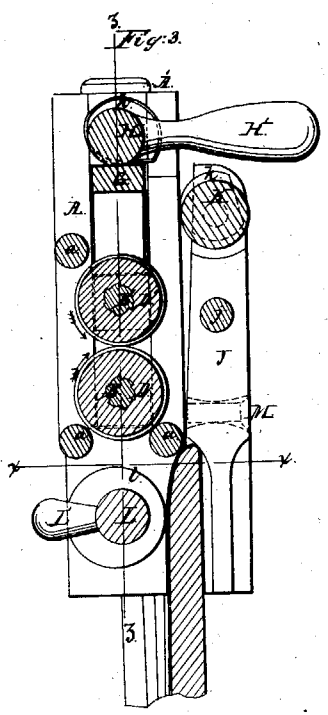
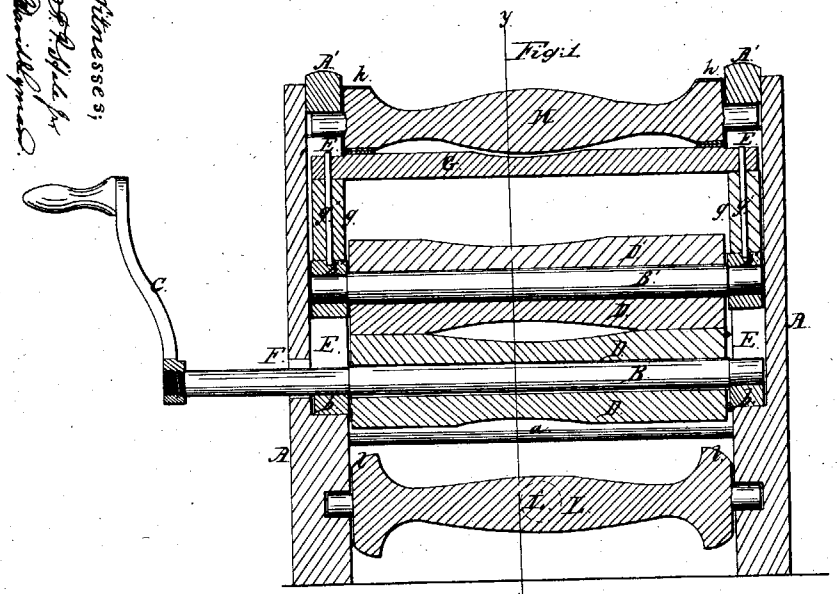
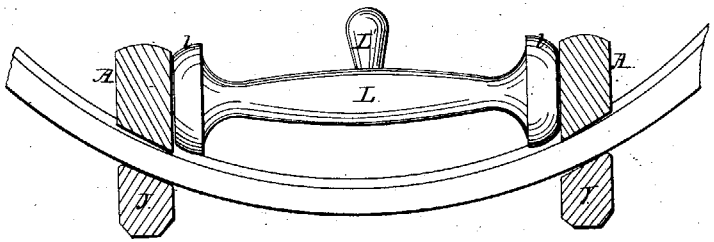
Witnesses;
J. R. Steele Jr.
David Lyman.
Inventor;
N. A. Rhoads.

UNITED STATES PATENT OFFICE.

N. A. RHOADS, OF WATERBURY, VERMONT.

IMPROVED CLOTHES-WRINGER.

Specification forming part of Letters Patent No. 34,646, dated March 11, 1862; Reissue No. 1,360, dated December 9, 1862.

DIVISION A.

*To all whom it may concern:*

Be it known that I, N. A. RHOADS, of Waterbury, in the county of Washington and State of Vermont, have invented certain new and useful Improvements in Clothes-Wringers; and I do hereby declare that the following is a full, clear, and exact description thereof, reference being had to the accompanying drawings, making a part of this specification, in which—

Figure 1 is a longitudinal section through the machine, taken in the vertical plane indicated by the red line *z z* in Fig. 3. Fig. 2 is a horizontal section through Fig. 3, as indicated by the red line *x x* thereon. Fig. 3 is a transverse section through Fig. 1, taken in the vertical plane indicated by the red line Y Y thereon.

Similar letters of reference indicate corresponding parts in the three figures.

My invention relates to certain novel improvements in that class of clothes-wringers which are made very portable and clamped to the tub or box in which the clothes are washed, and in which the articles are wrung, by passing them between two rollers having elastic surfaces, and subjecting them at the same time to the requisite degree of pressure to squeeze out the water.

To enable others skilled in the art to make and use my invention, I will proceed to describe its construction and operation.

A A represent two uprights, which are braced together by transverse rods *a a a*, so as to form a strong quadrangular frame for containing and supporting the wringing and clamping apparatus. B B′ are two iron shafts which have their bearings in journal-boxes *b b b′ b′*. One end of shaft B passes through a vertical slot, F, made through one of the uprights A, and receives on its end a hand-crank, C, by means of which the shaft B is turned in operating the machine. The journal-boxes *b b b′ b′* are let into vertical grooves E E, in which grooves these boxes are allowed to have a free vertical play, so that the shaft B′ while preserving its parallelism with the shaft B may at the same time be moved farther from and nearer to this shaft, as occasion requires. The shaft B is made with grooves, ribs, serrations, or longitudinal projections of any suitable description on its surface, and on this surface a rubber roller, D, is formed in the usual manner of putting rubber rollers on shafts. The india-rubber being put on such a shaft properly, all liability of this rubber working loose on the shaft is effectually prevented. A rubber roller, D′, surrounds the upper shaft, B′, which may be of the same or of a greater or less diameter than the lower roller, D, and this latter roller, D′, may be put on a shaft constructed as described for the lower roller, but as this upper roller, D′, is less liable to become loose on its shaft than the roller D the shaft B′ may have a smooth surface, if preferred. The proper construction of these two india-rubber rollers is important, and it is desired to so construct them that the articles which are passed between them should be squeezed uniformly, if there be as usual a greater bulk between the middle than between the ends of these rollers. For this purpose the surfaces of the two rubber rollers D and D′ taper from their ends to their middle, so that they are smaller in diameter in the middle than at their ends, as shown in Figs. 1 and 3 of the drawings. The peripheries of these two rollers D and D′ will thus touch each other at and near their ends, but a space will be left between the two rollers D and D′, at and near the middle thereof, corresponding with the increased thickness of the clothes usually passed through the machine at that point, through which space the greatest bulk of articles will pass as they are submitted to the action of the rollers, and all be equally or nearly equally squeezed. The ends of the upper roller, D′, rest on the ends of the lower roller, D, and the upper roller, with its shaft B′, is rotated in its bearings by the rolling friction of the lower roller. India-rubber springs *g g* are placed on the boxes *b′ b′* in the grooves E E, and on those blocks of rubber *g g* the ends of a transverse bar, G, rest. Above this transverse bar G a shaft, H, is arranged, having its upward bearings against the stationary blocks A′ A′. This shaft H is furnished with a lever or handle, H′, and on each end of the shaft is a cam-shaped enlargement, *h*, as shown in Figs. 1 and 3 of the drawings. Cams *h h* are faced with metal, and the ends of the bar G are also faced with metal, as represented in Fig. 1. These cams

*h h* are used to increase or diminish the pressure on the articles passed between the rollers D D′ and to give the required pressure to either.

The required pressure on the articles is obtained almost instantly by raising or depressing the handle H′, which operation rocks the cam-shaft H and brings the cams *h h* in the desired position, and while the articles are passing between the roller D D′ the pressure can be regulated as the articles increase or diminish in bulk.

It will be understood that the cams *h h* do not lift the upper roller D′. This roller is raised by the articles passed between the rollers, when the cams *h h* are in such a position as will allow the journal-boxes *b′ b′* to rise. Pins *g′ g′* extend from the journal-boxes *b′ b′* up through the rubber springs *g* and cross-bar G, as represented, to keep the parts in place.

An important advantage results from the employment and particular arrangement of the bar G with reference to the springs *g g*, the cams *h h*, and shaft H and lever or handle H′, as the said bar by such not only becomes useful as a stop for the handle and as a bearing for the cams, but it serves to so connect the two springs as to prevent either from crippling or bending laterally as well as being thrown out of place under the upward pressure of the roller-journal under it. Besides, it enables the journals of the shaft to be arranged directly over the springs, respectively, and to have the cams placed next to and between such journals.

On one side of the frame A A, and hinged at M to the uprights of said frame, is a clamping-frame, consisting of two parallel clamping-bars, J J, a transverse bar, *j*, and a rocking cam-shaft, K. This frame is hinged to frame A A by fulcrum-screws M, which are inserted strongly into A through tapering holes in the parallel bars J, and allow these bars to rock longitudinally.

The clamping of the entire machine to a tub, box, or barrel is effected by means of turning the shaft K, carrying cams K fixed on its ends, which, on being turned, act against A, as represented, and force the upper ends of frame J outward, and through the rocking of the frame on the hinges at M also forces the lower ends thereof inward.

To adapt the machine for tubs in which the staves are unusually thick the screws may be set farther out by unscrewing them to the proper extent, thus increasing the distance between the lower ends of the uprights A A and those of the frame J. The edges of the clamping ends of the frames A and J are beveled, as represented in Fig. 2 of the drawings, to accommodate them to the curvature of the tub.

L is a transverse rock-shaft, carrying on its ends two beveled cams or eccentrics, *l l*, and having its bearings in the lower ends of the uprights A A. This shaft is rocked by a handle, L′, and it may be used either in conjunction with the cam-shaft K for clamping the machine to the tub, or it may be used independently of this cam-shaft, and with the frame J, secured rigidly to the frame A A, after the forked ends of the machine are placed outside of the edge of the tub. The eccentrics *l l* are, by turning the shaft L, forced hard against the inside of the tub, and the machine is thus rigidly clamped to the tub.

In using the above described machine the screws at M are adjusted until the edge of the tub will pass between the lower ends of the uprights A A and those of the frame J, as represented in Fig. 2 of the drawings. The cam-shaft K is then turned, and the cams *k k* act against the uprights A A, and force the lower ends of the frame J hard against the outside of the tub, and clamp the machine to the tub rigidly. The wet articles are now taken up one at a time, if they be large, and passed between the rollers D D′, these rollers being turned in the direction indicated by the arrows in Fig. 3. As the articles are passed, one or more at a time, between the rollers, the pressure upon the upper roller, D′, is regulated according to the varying bulk of the articles, by working the cams *h h* on shaft H.

During the operation of wringing, the operator has one hand on the crank C and the other on the handle H′ of the cam-shaft H, and while she turns the rollers D D′ with one hand she can regulate the pressure with the other.

It will be seen that during the operation of the rubber rollers D D′ upon the articles passed between them there will be a pressure upon every part of the article between the rollers, in consequence of the peculiar shape given to them, while with cylindrical or straight rubber rollers the articles will be acted upon only where their greatest bulk occurs—viz., in the middle of the rollers, and the ends of such rollers have very little, if any, squeezing effect; therefore my rollers, made so as to taper toward the middle of their length, are considered as a great improvement upon the cylindrical rubber rollers which have been heretofore used.

I would further observe that the shaft L and its eccentrics *l l*, when combined and arranged with the frame A A and the clasping-frame J and its cam-shaft K, co-operate with the said frame J and its clamping devices in more effectually fastening the wringing-machine to a tub for when, with the screws M out so far as to let the machine slip loosely down astride of the edge of the tub, the frame J is forced against the tub by the rotation of K, only the lower ends of such frame will be moved in contact with the tub, but by means of the cams *l l* the upper parts and the whole proper surface of the jaws of the frame J may be brought up to bear firmly against the tub, the cams *l l* acting against the inner surface of the tub, at a point somewhat above the level of the lower ends of J, so as to enable it to have this effect.

I do not claim an elastic roller made with a cylindrical surface and arranged on two cones applied to a shaft, and in such manner that their lesser bases may be next to each other, the elastic covering being thicker at the middle than at either of its ends; but

I claim—

1. As an improvement in a clothes-wringing machine provided with elastic rollers the construction of either or both of such rollers, or, in other words, the arrangement of their operating-surfaces so that they may be at a greater distance asunder at their middle than at their ends, the whole being substantially in the manner and for the purpose as herein described.

2. The arrangement and combination of the connection and bearing bar G with the rubber springs *g g*, the shaft H, and its cams *h h*, the whole being applied to the frame A and its rollers D D′, substantially as described.

3. The arrangement of the shaft L and its cams *l l* with reference to the rollers D D′, the frame A, and the two bars J J, or their equivalents, affixed to the said frame.

In testimony whereof I have hereunto set my name in presence of two subscribing witnesses.

N. A. RHOADS.

Witnesses:

F. P. HALE, Jr.,

WM. O. HASKELL.